United States Patent
Mohtadi et al.

(10) Patent No.: US 10,840,550 B2
(45) Date of Patent: **\*Nov. 17, 2020**

(54) GEL ELECTROLYTE FOR USE IN A MAGNESIUM BATTERY

(71) Applicant: Toyota Motor Engineering & Manufacturing North America, Inc., Plano, TX (US)

(72) Inventors: Rana Mohtadi, Northville, MI (US); Oscar Tutusaus, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 125 days.

This patent is subject to a terminal disclaimer.

(21) Appl. No.: 16/130,477

(22) Filed: Sep. 13, 2018

(65) Prior Publication Data
US 2020/0091553 A1 Mar. 19, 2020

(51) Int. Cl.
*H01M 10/054* (2010.01)
*H01M 10/0565* (2010.01)
*H01M 10/058* (2010.01)

(52) U.S. Cl.
CPC ..... *H01M 10/0565* (2013.01); *H01M 10/054* (2013.01); *H01M 10/058* (2013.01); *H01M 2300/0082* (2013.01)

(58) Field of Classification Search
CPC .... H01M 4/466; H01M 10/04; H01M 10/054; H01M 10/0445; H01M 10/0468; H01M 10/05; H01M 10/0565; H01M 10/058; H01M 10/0568; H01M 10/0569; H01M 2300/0082; H01M 2300/0085
See application file for complete search history.

(56) References Cited

U.S. PATENT DOCUMENTS

| 5,385,679 | A | 1/1995 | Uy et al. |
| 5,585,039 | A | 12/1996 | Matsumoto et al. |
| 5,639,573 | A | 6/1997 | Oliver et al. |
| 9,240,613 | B2 | 1/2016 | Mohtadi et al. |
| 9,252,458 | B2 | 2/2016 | Mohtadi et al. |
| 9,431,678 | B2 | 8/2016 | Tutusaus et al. |
| 9,455,473 | B1 | 9/2016 | Mohtadi et al. |
| 2001/0049060 | A1* | 12/2001 | Aurbach ............... H01M 6/166 429/303 |

(Continued)

FOREIGN PATENT DOCUMENTS

JP 2007297684 * 11/2007

OTHER PUBLICATIONS

Carter et al. Angew. Chem. Int. Ed. 2014, 53, 3173-3177 (Year: 2014).*

*Primary Examiner* — Alexander Usayatinsky
(74) *Attorney, Agent, or Firm* — Christopher G. Darrow; Darrow Mustafa PC

(57) ABSTRACT

Gel electrolytes and other solid electrolytes for magnesium batteries include a monocarboranyl magnesium salt and an ether solvent having a relatively high boiling point. A polymer forms a gel or other solid matrix throughout which the monocarboranyl magnesium salt and ether solvent are uniformly distributed. Methods for making such electrolytes include combining solutions of monocarboranyl magnesium salt and polymer, followed by selectively removing the solvent in which polymer has high solubility, forcing gel formation.

13 Claims, 3 Drawing Sheets

(56) References Cited

U.S. PATENT DOCUMENTS

| | | | |
|---|---|---|---|
| 2007/0048605 A1* | 3/2007 | Pez | H01M 10/0568 429/199 |
| 2014/0349178 A1* | 11/2014 | Mohtadi | H01M 10/054 429/200 |
| 2016/0156063 A1* | 6/2016 | Mizuno | H01M 10/0569 429/80 |
| 2016/0181662 A1* | 6/2016 | Tutusaus | H01M 10/0568 429/188 |
| 2017/0117585 A1 | 4/2017 | Tutusaus et al. | |

* cited by examiner

US 10,840,550 B2

GEL ELECTROLYTE FOR USE IN A MAGNESIUM BATTERY

TECHNICAL FIELD

The present disclosure generally relates to battery electrolytes and, more particularly, to gel electrolytes for magnesium batteries.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Non-volatile battery electrolytes, including gel and solid-state electrolytes, can have multiple benefits and uses. These can include physical robustness, low volume, and improved ability to coat and/or adhere to anode surfaces, includes anodes having textured, porous, or otherwise heterogeneous surface morphology.

Magnesium batteries hold promise as successors to state-of-the art Li-ion technology, in part due to the natural abundance of elemental magnesium and high volumetric capacity of magnesium cells. In addition, three dimensional magnesium cells, in which a magnesium anode is surrounded on all sides or impregnated with a cathode material so that ion flow occurs in all directions simultaneously, can minimize cell volume and increase energy and power density. Some such three dimensional magnesium batteries are based on porous magnesium foam anodes that are impregnated with cathode material. Such a cell requires that the anode first be coated on all surfaces with a durable electrolyte layer. As described above, gel and solid state electrolytes may be ideal candidates for this application. Accordingly, it would be desirable to develop improved gel and solid-state electrolytes for magnesium batteries, and improved methods for manufacturing such electrolytes.

SUMMARY

This section provides a general summary of the disclosure, and is not a comprehensive disclosure of its full scope or all of its features.

In various aspects, the present teachings provide an electrolyte for a magnesium battery. The electrolyte includes an ether solvent having a boiling point, at standard pressure, greater than 100° C. The electrolyte further includes a monocarboranyl magnesium salt, and a matrix-forming polymer, present at a concentration that exceeds its solubility in the ether solvent.

In other aspects, the present teachings provide a three-dimensional magnesium battery. The three-dimensional magnesium battery includes a magnesium foam anode and a continuous electrolyte layer coating all surfaces of the magnesium foam anode. The continuous electrolyte layer includes an ether solvent having a boiling point, at standard pressure, greater than 100° C. The electrolyte further includes a monocarboranyl magnesium salt, and a matrix-forming polymer, present at a concentration that exceeds its solubility in the ether solvent. The three-dimensional magnesium battery further includes a continuous cathode layer coating most or all exposed surfaces of the continuous electrolyte layer.

In still other aspects, the present teachings provide a method of making an electrolyte for a magnesium battery. The method includes a step of combining first and second solutions. The first solution includes an ether solvent having a boiling point, at standard pressure, greater than 100° C., and a monocarboranyl magnesium salt dissolved in the ether solvent. The second solution includes a second solvent having a boiling point, at standard pressure, less than 100° C.; and a polymer dissolved in the second solvent. The polymer has low solubility in the ether solvent. The method further includes a step of evaporatively removing the second solvent under conditions at which the ether solvent does not substantially evaporate, so that the polymer at least partially comes out of solution.

Further areas of applicability and various methods of enhancing the above coupling technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present teachings provide gel or solid-state electrolytes for magnesium batteries, and methods for making the electrolytes. The electrolytes of the present teachings support have appreciable thermal stability, are electrochemically compatible with magnesium anodes, and support magnesium stripping/deposition. Due to their solid or gel-like nature, they can be particularly advantageous for use with hells having unusual or complex shape, such as cells having magnesium foam electrodes.

Electrolytes of the present teachings include a magnesium monocarboranyl salt, such as $Mg(CB_{11}H_{12})_2$. Disclosed electrolytes further include an ether solvent having a high boiling point and a polymer that is insoluble or only partially soluble in the ether solvent. Methods for making combining a first solution of the magnesium monocarboranyl salt in the high boiling point ether, with a second solution of the polymer in a low boiling point solvent. Evaporative removal of the low boiling point solvent causes the mixture to gelatinize and/or solidify, producing the gel electrolyte.

Figure 1:
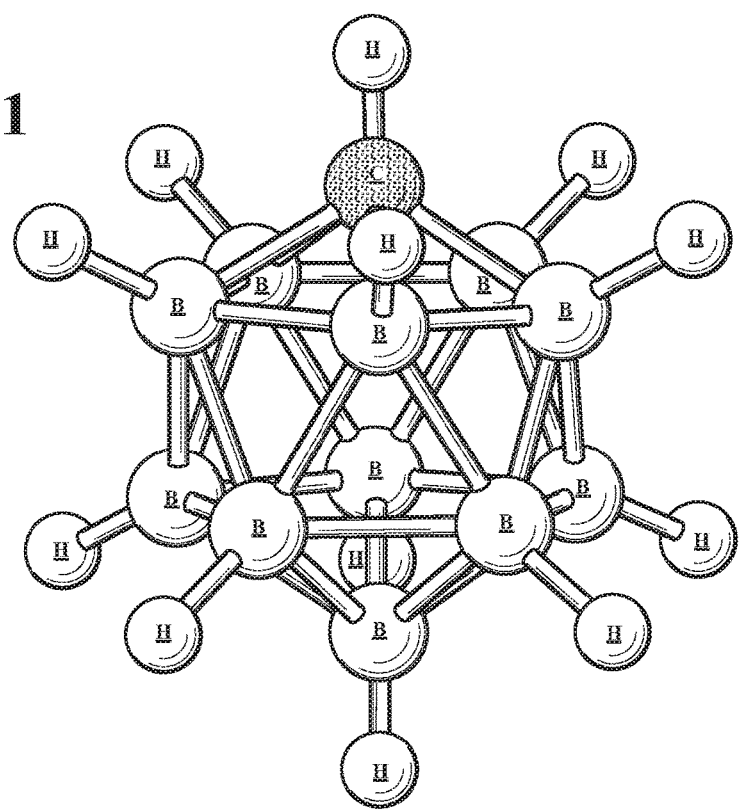
FIG. 1 is a perspective schematic view of a monocarboranyl anion, closo-1-carba-dodecaborane, of a monocarboranyl magnesium salt present in an electrolyte of the present teachings.

Thus, a gel-like or solid state electrolyte (hereinafter referred to simply as "the electrolyte") is disclosed having a monocarboranyl magnesium salt. As the name indicates, the monocarboranyl magnesium salt includes a magnesium cation and a monocarboranyl anion. FIG. 1 shows perspective schematic view of an exemplary monocarboranyl anion, closo-1-carba-dodecaborane suitable for use in the monocarboranyl magnesium salt and having the formula $CB_{11}H_{12}$. In different variations, the monocarboranyl anion can be any closo-carboranyl anion having a formula $[CB_{(n-1)}X_n]^-$, where n is an integer within a range of six to twelve and where X is any substituent or combination of substituents. Suitable, non-limiting examples of substituents include hydrogen, halogen, alkyl, alkoxy, cycloalkyl, aryl, aryloxy, amino, thioether, phosphine, and any other substituent compatible with magnesium metal. In certain specific implementations, the monocarboranyl anion can be $CB_{11}H_{12}$.

The electrolyte further includes an ether having a relatively high boiling point, and referred to hereinafter as "the ether solvent." In some implementations, the ether solvent can have a boiling point, at standard pressure of 1 Atm, greater than 100° C., preferably greater than 150° C., most preferably greater than 200° C. Suitable species for use as the ether solvent include, without limitation: diethylene glycol dimethyl ether (diglyme), triethylene glycol dimethyl ether (triglyme), tetraethylene glycol dimethyl ether (tetraglyme), or a polyethylene glycol dimethyl ether (PEGDME).

The electrolyte further includes a polymer that is partially soluble or insoluble in the ether solvent. In some implementations, the solubility of the polymer in the ether solvent can be defined as the saturation concentration at conditions of standard pressure and temperature of 1 Atm and 25° C. In various concentrations, the solubility can be less than 10 weight percent, or less than 1 weight percent, or less than 0.1 weight percent. In some implementations, the solubility is defined as the saturation concentration at conditions of standard pressure and temperature of 1 Atm and 25° C. Exemplary polymers suitable for use in the electrolyte can include, without limitation, polyvinylidene fluoride (PVDF), polytetrafluoroethylene (PTFE), styrene butadiene rubber, and various polyimides.

In some implementations, the polymer will be present in the electrolyte at a concentration that exceeds its solubility in the ether solvent. It will be understood that the polymer, in part due to its limited or negligible solubility in the ether solvent, can form a gel-like or solid matrix in which the monocarboranyl magnesium salt and the ether solvent are contained. This causes the electrolyte to be a homogeneous material having a solid, semi-solid, gel-like, or glassy phase.

Figure 2:
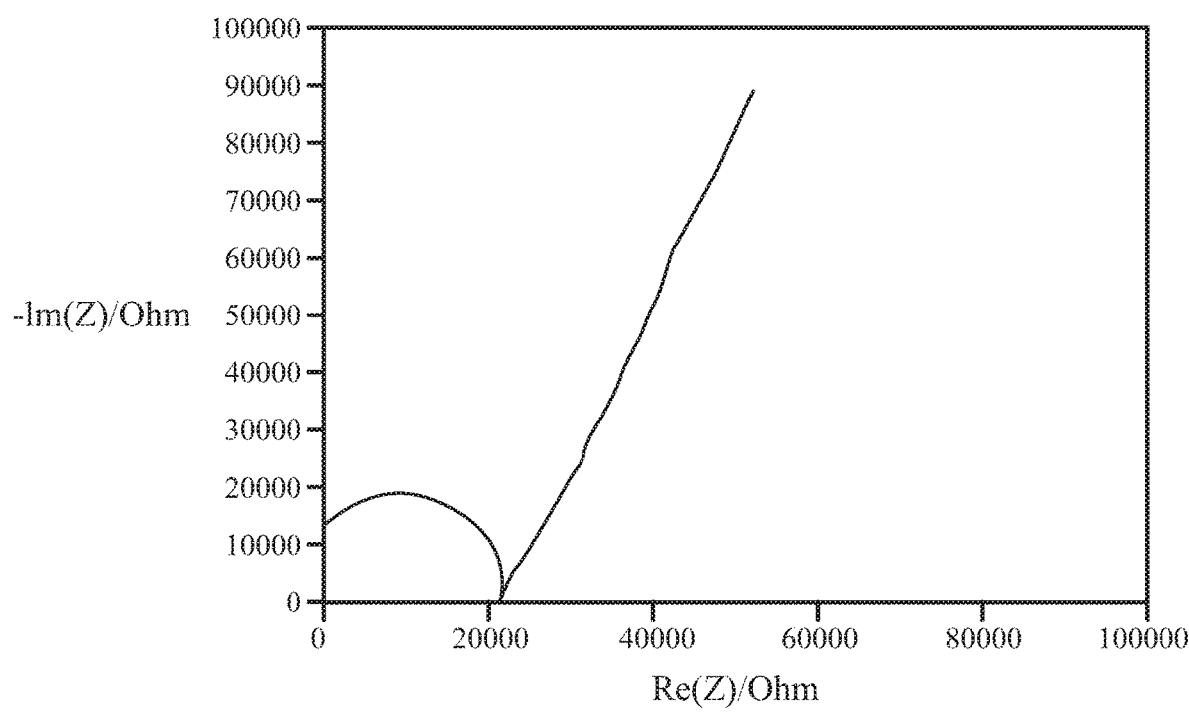
FIG. 2 is a Nyquist plot under open circuit voltage of a cell having a comparative gel disk electrolyte.
Figure 3:
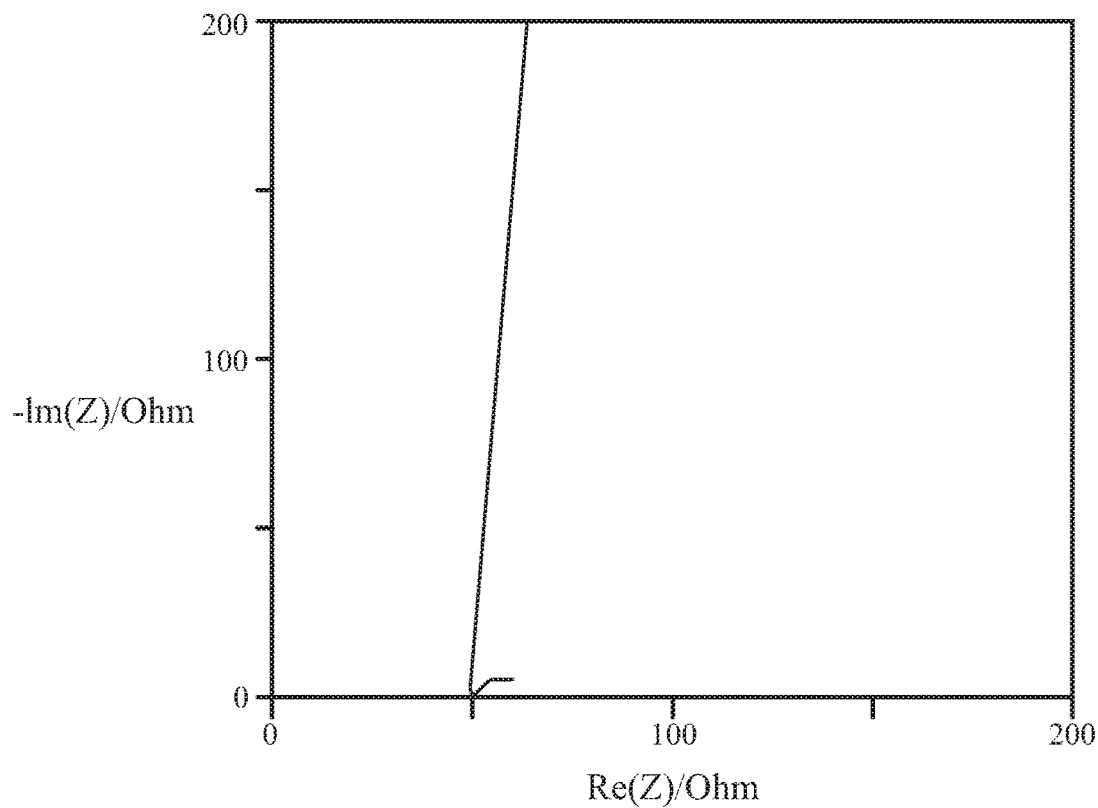
FIG. 3 is a Nyquist plot under open circuit voltage of a cell having a gel disk electrolyte of the present teachings, including a monocarboranyl magnesium salt.

FIGS. 2 and 3 show Nyquist impedance plots, under open circuit voltage, of cells having a comparative gel disk electrolyte and a gel disk electrolyte of the present teachings, respectively. The comparative electrolyte includes a gel matrix of PVDF in tetraglyme and is measured to have an ionic conductivity of $6 \times 10^{-4}$ mS/cm. The electrolyte of the present teachings has an equivalent gel matrix of PVDF in tetraglyme, and includes $Mg(CB_{11}H_{12})_2$. The electrolyte of FIG. 3 shows an ionic conductivity of 0.3 mS/cm suitable for a battery electrolyte.

Figure 4:
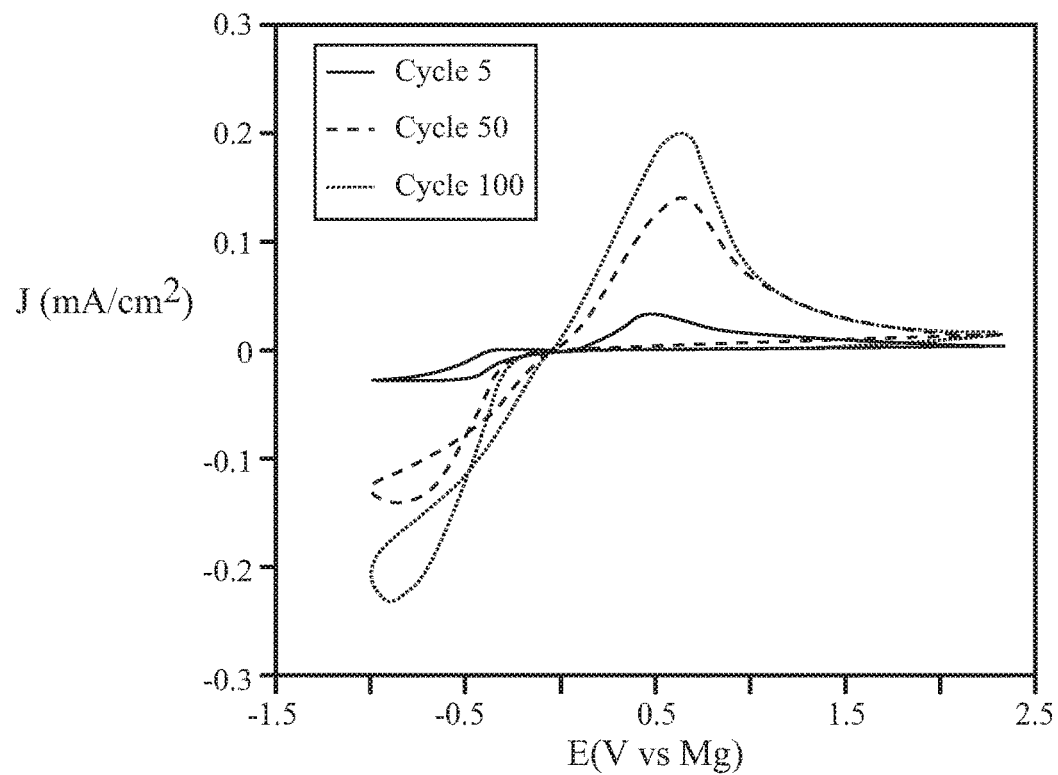
FIG. 4 is a plot of selected cyclic voltammograms of the cell of FIG. 3.

FIG. 4 shows a plot of cyclic voltammograms of a cell composed of a pt disk as anode, the gel described in FIG. 3 as electrolyte, and a Mg disk as cathode, at 5, 50, and 100 cycles. The results clearly show that the electrolyte of the present teachings has good electrochemical stability, allows for Mg deposition and stripping, and supports appreciable current over a significant number of cycles.

It will be appreciated that electrolytes of the type described herein can be of particular utility in conjunction with magnesium anodes having unusual shapes, due to the electrolyte's gel-like or solid nature, and consequent ability to coat an anode and/or fill voids in a porous anode. In an example, electrolytes of the present teachings can be used in conjunction with porous magnesium foam anodes, such as can be employed in a three-dimensional (3-D) magnesium battery.

Figure 5:
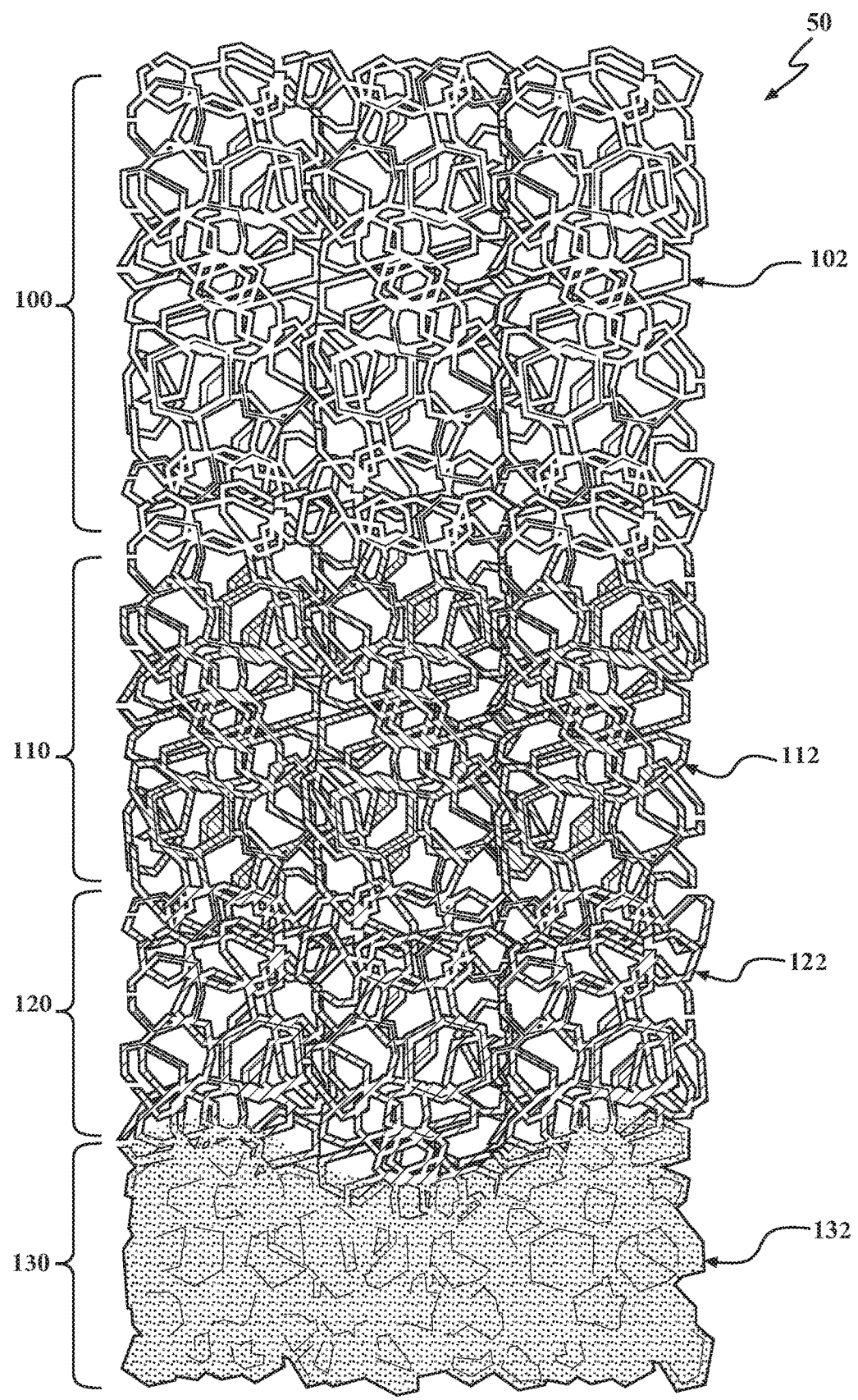
FIG. 5 is a perspective view of a structure showing progressive layers of a 3-D magnesium battery having a gel or solid-state electrolyte of the present teachings.

FIG. 5 shows a perspective view of a structure 50 showing progressive layers of a 3-D magnesium battery 130 having a magnesium foam anode 112. The view of FIG. 5 is divided into segments 100, 110, 120, and 130 in which layers of the 3-D magnesium battery 100 are progressively removed to illustrate the interior construction of the battery 130. Segment 100 illustrates a copper foam substrate 102. Segment 110 illustrates the magnesium foam anode 112, having magnesium plated onto all surfaces of the copper foam substrate 102. Segment 120 illustrates a continuous electrolyte layer 122 coating all surfaces of the magnesium foam anode 112. It will be understood that the continuous electrolyte layer 122 can be formed of any electrolyte of the present teachings.

Segment 130 of FIG. 5 corresponds to a completed 3-D magnesium battery, and illustrates a continuous cathode layer 132 coating most or all exposed surfaces of the continuous electrolyte layer 122, as well as substantially impregnating and filling pores created by the structure of the magnesium foam anode 112. It will generally be desirable that the continuous cathode layer 132 be electronically conductive and conductive of magnesium ions. As such, the continuous cathode layer 132 can include an electronic conductor, an ionic conductor; and a reversible active material storage component; the reversible active storage material serving to facilitate uptake and storage of magnesium during battery discharge, and release of magnesium during battery charging.

The ionic conductor of the continuous cathode layer 132 can include any suitable magnesium electrolyte including, but not limited to, those of the present teachings. In certain implementations in which the 3-D magnesium battery is a dual-ion battery, the ionic conductor can include a non-magnesium electrolyte. The electronic conductor can, in many implementations, be a conductive powder such as Ketjen black or other conductive carbon, metal powder, or conductive polymeric powder. The reversible active storage material can be any material suitable for use as a cathode in a magnesium electrochemical cell, typically in a powder slurry. Non-limiting examples of such materials include, Chevrel phase molybdenum composition such as $Mo_6S_8$, $FeSiO_4$, K-$\alpha MnO_2$, $MgFePO_4$, sulfur, organosulfur compounds, or any other suitable materials.

It will be understood that the continuous electrolyte 122 layer serves not only to transport magnesium ions between the magnesium foam anode 112 and the continuous cathode layer 132, but also to form a physical barrier preventing contact between the magnesium foam anode 112 and the continuous cathode layer 132, providing electric insulation to the anode 112 and thereby preventing short circuits. As such, it will be understood that it is generally desirable in 3-D magnesium battery deployments that the electrolyte have high magnesium ion conductivity and low electronic conductivity; for example. For example, the electrolyte can confer on the continuous electrolyte layer magnesium ion conductivity greater than 0.01 S/cm and electric conductivity less than $10^{-8}$ S/cm.

A method is additionally disclosed for making gel-like or solid-state electrolytes for a magnesium battery, the electrolytes produced by the method being of the types and variations described above. The method includes a step of combining first and second solutions. The first solution includes a monocarboranyl magnesium salt dissolved in an ether solvent. The second solution includes a polymer dissolved in a second solvent. The terms "carboranyl magnesium salt", "ether solvent", and "polymer" as used in connection with the method have the same definitions as described above with respect to the electrolyte composition. The second solvent will generally be a relatively volatile solvent, having a boiling point significantly lower than that of the ether solvent. In some implementations, the second solvent can have a boiling point less than 100° C., preferably less than 85° C. under standard conditions of temperature and pressure. In addition, it will generally be desirable that the polymer have high solubility in the second solvent, in comparison to the low solubility of polymer in the ether solvent discussed above. Non-limiting examples of solvents suitable for use as the second solvent can include tetrahydrofuran (THF), 1,2-dimethoxyethane (DME), and any other relatively volatile solvent in which the polymer has significant solubility.

The method further includes a step of evaporatively removing the second solvent under conditions in which the ether solvent is substantially retained. For example, in some implementations it may be desirable to evaporatively remove greater than 95% or 99% of the second solvent while retaining greater than 95% or 99% of the ether solvent. Such evaporative removal can be achieved by heating the mixture to an elevated temperature, application of vacuum, or a combination thereof. As such the aforementioned conditions of evaporative removal can include any combination of temperature, pressure, and duration. It will be understood that, the larger the difference between boiling points of the ether solvent and the second solvent, the more easily evaporative removal of the second solvent with concurrent retention of the ether solvent can be achieved.

Due to the low-to-negligible solubility of the polymer in the ether solvent described above, the polymer will gradually come out of solution as the second solvent is evaporatively removed, thereby forming a gel or solid matrix throughout which the monocarboranyl magnesium salt and the ether solvent are uniformly distributed. In some implementations, the polymer may partially but incompletely come out of solution. The aforementioned gel or solid matrix, throughout which the monocarboranyl magnesium salt and the ether solvent are uniformly distributed, is an electrolyte of the present teachings, as described above.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A three-dimensional magnesium battery, comprising:
   a magnesium foam anode;
   a continuous electrolyte layer coating all surfaces of the magnesium foam anode, the continuous electrolyte layer comprising:
      an ether solvent having a boiling point, at standard pressure, greater than 100° C.;
      a monocarboranyl magnesium salt; and
      a matrix-forming polymer, present at a concentration that exceeds its solubility in the ether solvent; and
   a continuous cathode layer coating most or all exposed surfaces of the continuous electrolyte layer.

2. The three-dimensional magnesium battery as recited in claim 1, wherein the ether solvent has a boiling point, at standard pressure, greater than 150° C.

3. The three-dimensional magnesium battery as recited in claim 1, wherein the ether solvent has a boiling point, at standard pressure, greater than 200° C.

4. The electrolyte as recited in claim 1, wherein the monocarboranyl salt comprises a closo-carboranyl anion having a formula $[CB_{(n-1)}X_n]^-$, wherein X is selected from the group consisting of: hydrogen, halogen, alkyl, alkoxy, cycloalkyl, aryl, aryloxy, amino, thioether, phosphine, and combinations thereof.

5. The three-dimensional magnesium battery as recited in claim 1, wherein the monocarboranyl salt comprises $Mg(CB_{11}H_{12})_2$.

6. A method of making a electrolyte for a magnesium battery, the method comprising:
   combining:
      a first solution having:

an ether solvent having a boiling point, at standard pressure, greater than 100° C.; and
a monocarboranyl magnesium salt dissolved in the ether solvent; and
a second solution having:
a second solvent having a boiling point, at standard pressure, less than 100° C.; and
a polymer dissolved in the second solvent, the polymer having low solubility in the ether solvent;
evaporatively removing the second solvent under conditions at which the ether solvent does not substantially evaporate, so that the polymer at least partially comes out of solution.

7. The method as recited in claim 6, wherein the ether solvent has a boiling point, at standard pressure, greater than 150° C.

8. The method as recited in claim 6, wherein the ether solvent has a boiling point, at standard pressure, greater than 200° C.

9. The method as recited in claim 6, wherein the second solvent has a boiling point, at standard pressure, less than 85° C.

10. The method as recited in claim 6, wherein the monocarboranyl salt comprises a closo-carboranyl anion having a formula $[CB_{(n-1)}X_n]^-$, wherein X is selected from the group consisting of: hydrogen, halogen, alkyl, alkoxy, cycloalkyl, aryl, aryloxy, amino, thioether, phosphine, and combinations thereof.

11. The method as recited in claim 6, wherein the monocarboranyl salt comprises $Mg(CB_{11}H_{12})_2$.

12. The method as recited in claim 6, wherein the ether solvent is selected from the group consisting of: diethylene glycol dimethyl ether (diglyme), triethylene glycol dimethyl ether (triglyme), tetraethylene glycol dimethyl ether (tetraglyme), and polyethylene glycol dimethyl ether (PEGDME).

13. The method as recited in claim 6, wherein the polymer is selected from the group consisting of: polyvinylidene fluoride (PVDF), polytetrafluoroethylene (PTFE), styrene butadiene rubber, and a polyimide.

* * * * *